G. W. Barnes.
Safety Bridle.
No. 3,259. Reissued Jan. 12, 1869.
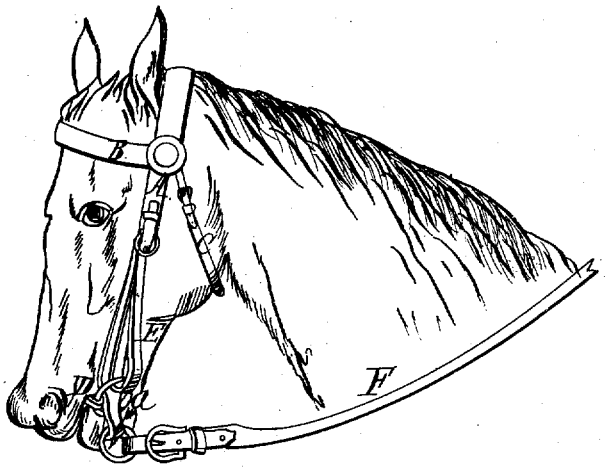
Witnesses:
John Stevens
Emma J. Ely.
Inventor:
Gilbert W. Barnes
H. PETERS, PHOTO-LITHOGRAPHER, WASHINGTON, D. C.

United States Patent Office.

GILBERT W. BARNES, OF MOUNT VERNON, NEW YORK.

*Letters Patent No.* 80,897, *dated August* 11, 1868; *reissue No.* 3,259, *dated January* 12, 1869

IMPROVED SAFETY-BRIDLE.

The Schedule referred to in these Letters Patent and making part of the same.

*To all whom it may concern:*

Be it known that I, GILBERT W. BARNES, of Mount Vernon, in the county of Westchester, and State of New York, have invented an Improved Driving-Bridle; and I do hereby declare that the following is a full, clear, and exact description thereof, which will enable others skilled in the art to make and use the same, reference being had to the accompanying drawing, which forms part of this specification.

This invention relates to a new and improved bridle, of that class which have the bit and reins arranged and applied in such a manner that by pulling on the reins the bit will be drawn backward or upward in the mouth, and made to bear against the flesh at the angle of the mouth, thereby giving the rider or driver complete control over the animal.

This principle, of drawing the bit upward against the angle of the mouth, is now very generally conceded by horsemen as being a correct one, in order to control a vicious horse, and quite a number of plans have been devised in order to effect that end, all of which have involved a greater or less additional expense in the manufacture of a bridle.

The object of the present invention is to obtain the result above specified by the simplest possible means, which will not add to the expense of manufacture of a bridle, nor be liable to get out of repair, which will be strong, and certain or sure in its operation The accompanying drawing represents a side view of my invention applied to a horse.

A represents one of the cheek-straps of a bridle, which straps are continuations of the headstall, and are thus, together, quite simple in construction.

B is the brow-band;

C, the throat-latch; and

D, the bit.

The bit is suspended and held by supplemental straps E E, which consist of single straps united to the sides of the cheek-straps, so as to form loops, which receive the rings of the bit. These loops may be provided with buckles or other devices, in order to make them adjustable and removable if desired.

The lower ends of the cheek-pieces pass through the rings of the bit to the driving-reins F, being connected thereto in any suitable manner.

It will be seen that the bit D is retained in proper position in the horse's mouth by the supplementary straps E E, and by pulling on the reins F the cheek-straps A will be drawn through the rings *a*, at the ends of the bit, and the latter drawn upward and made to bear or press against the angle at the inner end of the mouth, and the desired end attained.

Thus, by this simple arrangement, I dispense with all pulleys, and the various additional parts now applied to a bridle to effect the same purpose, and thereby greatly economize in the cost of manufacture, besides obtaining a more certain action of the bit under the pull of the reins, as there is little friction to contend with, and no part of the bridle subject to any undue strain.

I disclaim any of the parts, the subject-matter of the Letters Patent granted to Samuel B. Hartman, dated June 28, 1864.

Having thus described my invention,

What I claim as new, and desire to secure by Letters Patent, is—

The cheek-pieces A of the headstall, passing to the driving-rein through the rings of the bit, and supplemental straps E, secured to said cheek-pieces, combined and applied substantially as described.

To the above, I have signed my name, this 11th of December, 1868.

GILBERT W. BARNES.

Witnesses:

B. VAN GROSBUK,

JOHN STEVENS.